US008722779B2

(12) United States Patent
Panzer et al.

(10) Patent No.: US 8,722,779 B2
(45) Date of Patent: May 13, 2014

(54) THERMOPLASTICALLY PROCESSIBLE AMINOPLASTIC RESIN, THERMOSET MICROFIBRE NON-WOVENS, AND PROCESS AND PLANT FOR THEIR PRODUCTION

(75) Inventors: Ulf Panzer, Perg (AT); Bernd Riedel, Unterwellenborn (DE); Steffen Pfeiffer, Linz (AT); Hartmut Bucka, Eggendorf (AT); Ina Sigmund, Chemnitz (DE); Frank Meister, Rudolstadt (DE); Markus Machherndl, Leonding (AT); Markus Grossalber, Ernsthofen (AT)

(73) Assignee: Borealis Agrolinz Melamine GmbH, Linz (AT)

( * ) Notice: Subject to any disclaimer, the term of this patent is extended or adjusted under 35 U.S.C. 154(b) by 761 days.

(21) Appl. No.: 12/682,375

(22) PCT Filed: Oct. 10, 2008

(86) PCT No.: PCT/EP2008/063680
§ 371 (c)(1),
(2), (4) Date: Jun. 16, 2010

(87) PCT Pub. No.: WO2009/050128
PCT Pub. Date: Apr. 23, 2009

(65) Prior Publication Data
US 2010/0269318 A1 Oct. 28, 2010

(30) Foreign Application Priority Data

Oct. 12, 2007 (DE) .......................... 10 2007 049 992
Feb. 7, 2008 (DE) .......................... 10 2008 008 453

(51) Int. Cl.
*C08K 5/34* (2006.01)
*D04H 1/46* (2012.01)
*C08G 73/06* (2006.01)
*D04H 1/00* (2006.01)

(52) U.S. Cl.
USPC .............. 524/100; 28/104; 528/423; 442/335

(58) Field of Classification Search
USPC .............. 28/104; 442/335; 528/423; 524/100
See application file for complete search history.

(56) References Cited

U.S. PATENT DOCUMENTS 2,915,418 A * 12/1959 Wolfrom ........................ 523/206
3,967,032 A 6/1976 Plotz et al.
(Continued)

FOREIGN PATENT DOCUMENTS

CA 2577944 A1 3/2006
DE 7027961 7/1970
(Continued)

OTHER PUBLICATIONS

Woebcken, ed., "Melamine and Melamine/Phenol Resin Molding Materials: Composition, Characteristics of Processing and Material Use.", Kunststoff-Handbuch Bd. 10 'Duroplaste', Munich, 1988, pp. 266-274.

(Continued)

*Primary Examiner* — Bijan Ahvazi
*Assistant Examiner* — Atnaf Admasu
(74) *Attorney, Agent, or Firm* — The Webb Law Firm

(57) ABSTRACT

The invention relates to a thermoplastic processible aminoplast resin, a method for its production and a fine fiber non-woven material as textile area of fibers from aminoplast resins, in particular duroplastic triazine resins, which have an average fiber diameter of 0.1 to 100 μm and between 1 and 1000 branching arms and between 1 and 300 branching points per square millimeter. The invention also relates to a method for production of duroplastic fine fiber non-woven material in which a melt of melamine resin is pressed through spinning nozzles and blown by the escaping hot air to fine fibers, the fine fibers are separated from the air stream and deposited to a non-woven material consisting of a tangled layer, a treatment with a media causing cross-linking and a neutralization step follows, and the fine fibers are glued to a non-woven material in a subsequent thermal after-treatment, whereat the thermal after-treatment comprises two steps.

22 Claims, 7 Drawing Sheets

(56) References Cited

U.S. PATENT DOCUMENTS

| | | | |
|---|---|---|---|
| 4,081,426 A * | 3/1978 | Michel et al. | 528/254 |
| 5,084,488 A | 1/1992 | Weiser et al. | |
| 5,814,349 A | 9/1998 | Geus et al. | |
| 6,297,178 B1 | 10/2001 | Berbner et al. | |
| 7,173,104 B2 | 2/2007 | Ratzsch et al. | |
| 7,208,540 B2 * | 4/2007 | Ratzsch et al. | 524/445 |
| 2003/0171050 A1 | 9/2003 | Eichhorn et al. | |
| 2004/0024131 A1 | 2/2004 | Borner et al. | |
| 2005/0250896 A1 * | 11/2005 | Ratzsch et al. | 524/500 |
| 2006/0100317 A1 | 5/2006 | Ratzsch et al. | |
| 2006/0252909 A1 | 11/2006 | Pfeiffer et al. | |
| 2007/0048522 A1 * | 3/2007 | Ratzsch et al. | 428/375 |
| 2007/0055040 A1 | 3/2007 | Ratzsch et al. | |
| 2008/0203602 A1 | 8/2008 | Riedel et al. | |
| 2009/0239978 A1 | 9/2009 | Pfeiffer et al. | |

FOREIGN PATENT DOCUMENTS

| | | | |
|---|---|---|---|
| DE | 2364091 | | 7/1974 |
| DE | 2345484 | A1 | 4/1975 |
| DE | 4014989 | A1 | 11/1991 |
| DE | 19617634 | A1 | 11/1997 |
| DE | 19620379 | A1 | 11/1997 |
| DE | 10038030 | A1 | 2/2002 |
| DE | 10056398 | A1 | 5/2002 |
| DE | 10302079 | A1 | 8/2004 |
| EP | 0017671 | A1 | 10/1980 |
| EP | 0093965 | A2 | 11/1983 |
| EP | 0221330 | A1 | 5/1987 |
| EP | 0408947 | A2 | 1/1991 |
| EP | 1403405 | A2 | 3/2004 |
| GB | 1304540 | | 1/1973 |
| GB | 1452629 | | 10/1976 |
| WO | 9620239 | A1 | 7/1996 |
| WO | 9740223 | A1 | 10/1997 |
| WO | 0164984 | A1 | 9/2001 |
| WO | 0240564 | A1 | 5/2002 |
| WO | 03046053 | A1 | 6/2003 |
| WO | 03106558 | A1 | 12/2003 |
| WO | 2004056900 | A1 | 7/2004 |
| WO | 2004092239 | A1 | 10/2004 |
| WO | 2006024544 | A1 | 3/2006 |
| WO | 2006100041 | A1 | 9/2006 |
| WO | WO 2006/100041 * 9/2006 | | ............ D04H 3/03 |
| WO | 2006136457 | A1 | 12/2006 |
| WO | 2007096200 | A1 | 8/2007 |
| WO | 2009010546 | A1 | 1/2009 |

OTHER PUBLICATIONS

Ullmanns Encyclopedia of Industrial Chemistry, "Melamine Resins", 1987, pp. 130-131, vol. A2.

* cited by examiner principal view of a spinning beam module from below principal view of a spinning beam module from the side

US 8,722,779 B2

THERMOPLASTICALLY PROCESSIBLE AMINOPLASTIC RESIN, THERMOSET MICROFIBRE NON-WOVENS, AND PROCESS AND PLANT FOR THEIR PRODUCTION

BACKGROUND OF THE INVENTION

1) Field of the Invention

The present invention relates to a thermoplastic processible aminoplast resin, a process for its production, a duroplastic fine fiber non-woven material, a process and an apparatus for the production of duroplastic fine fiber non-woven material from thermoplastic processible aminoplast resins, in particular melamine resins, and the use of the duroplastic fine fiber non-woven materials.

2) Description of the Prior Art

In different areas of the processing industry a high demand on fiber materials exists, which have to be chemical resistant, hardly inflammable, easy to process, producible to low costs and without danger for human and environment. Areas of application of such fiber materials are for instance protective clothing or the interior of vehicles and hotel furniture/soft furnishing for public buildings, where the requirements regarding resistance against flames are high, furthermore insulating material for engines or filter materials for industrial processes.

Duroplastic material on the basis of triazine resins, as for example melamine-formaldehyde-resin, are very well suited for the mentioned application and form a group of hardly inflammable, chemically resistant and low cost starting materials producible in large amounts.

A disadvantage in the production of fibers or foams, semi-finished products or moulding materials, as for instance coatings, laminated material, laminates, molding materials, for domestic use and the electrical industry from triazine resins is however their difficult processability in usual thermoplastic processing methods like extrusion, injection molding or blow molding since high molecular melamine resins are cross-linked and infusible.

Non-cross-linked lower molecular melamine resin precondensates have a melt viscosity being too low for these processing methods and can solely be processed as highly filled molding masses with long cycle times by curing of the products (Woebcken, W. Plastic-Handbook, Vol. 10 "Duroplastic", publisher Carl Hanser, Munich 1988, page 266-274).

Fibers (EP 00 93 965 A1), foams (EP 00 17 671 A1) or coatings (WO 96/20239 A1) from melamine resins can only be produced starting from solutions of the melamine resin precondensates by curing during shaping due to the low melt viscosity of the melamine resin precondensates.

Furthermore, the volatile side products generate micro pores and cracks in the surface of the product during polycondensation of the aminoplast precondensates. Therefore, materials are formed, which have a reduced resistance in respect to environmental impacts.

DE 100 56 398 describes a triazine formaldehyde resin processible from the melt, which is produced in a laborious three-step process. The precuring occurs in this case at relatively high temperatures (160-200° C.) in an extruder, whereby an extensive precuring is caused and therefore a high softening point above 100° C., whereby in turn a narrow processing window is caused.

Fiber materials are producible from melamine resins according to known methods (DE 100 38 030, WO 2006/100041). In case of the production according to a method of DE 100 38 030—in contrast to the method described here, whereat non-woven materials are produced in a one-step process from etherified melamine resins (so called MER)—practically no textile fibers can be produced 100% of melamine resins from the staple fibers thus obtained. Therefore, the use of such melamine resin fibers in the mentioned application is restricted or demands further, usually flame resistant fibers for guaranteeing the required properties.

Technologies and methods of the textile fleece formation are essentially influenced by the tradition based on the application of natural fibers. Natural fibers are present as staple fibers, which are defined by length and fineness. Synthetical fibers from melamine resins according to the mentioned methods, which are more suitable as any natural fiber for the mentioned application due to their preferred chemical and physical properties, are processed by processing steps as for instance carding according to the methods known from the prior art, in order to produce a hairline or a textile fleece therefrom. These processing steps are complex, laborious and lead to an unsatisfied result, since damages of the fibers occur and usually for guaranteeing the processibility a combination with other kind of fibers is required.

In practice, for instance fibers on the basis of polyaramide (m- and p-aramide) are used what increases the complexity of the production and increases considerably the production costs of such textile fleeces. It would be in particular of large interest for the mentioned application to provide a fleece ("non-woven") for application as heat and flame resistant barrier layer in protection cloths, insulating materials and textile filter materials.

A method for the production of duroplastic fine fiber non-woven material is described in WO 2006/100041. The non-woven material obtained by this method shows large advantages compared to fiber materials obtainable by different methods; however their properties are still further improvable. In particular, their flexibility, strength and stability during further processing to the final products have to be improved.

DETAILED DESCRIPTION OF THE INVENTION

Based on the described prior art it is an object of the present invention to provide an aminoplast resin processible with thermoplastic methods, which is easy to produce, has a broad processing window and is in particular suitable for the production of fibers and fiber containing non-woven materials.

It is also an object of the present invention to provide a fine fiber non-woven material from thermoplastic processible aminoplast resins or triazine resins, in particular thermoplast processible melamine resins, as well as a method and an apparatus for its production.

This object is being solved by a thermoplastic processible aminoplast resin, a method for its production, a duroplastic fine fiber non-woven material and the method and the apparatus to its production of the present invention.

Accordingly, the aminoplast resin according to the invention is characterized by a viscosity between 0.1 to 200 Pas, in particular preferably between 1 to 150 Pas, in particular preferably between 3 to 100 Pas, at temperatures between 90 to 150° C., preferably between 100 to 150° C., in particular preferably between 110 to 140° C. over a time period of at least 15 minutes, preferably of at least 20 minutes, in particular preferably of at least 30 minutes.

In a preferred embodiment the aminoplast resin has a viscosity between 3 to 100 Pas over a time period of at least 25 minutes at a temperature of 130° C.

The resin has therefore a sufficient stability under the usual processing conditions of thermoplast technologies like for instance extrusion, injection molding or blow molding. The resin according to the invention undergoes during the indicated time period no or only a minimal cross-linking or self condensation so that it is thermoplastic processible.

The aminoplast resin of the invention has a glass transition temperature of more than 40° C., preferably between 40° C. and 80° C., in particular preferably between 45° C. and 65° C. The glass transition temperature $T_G$ is thereby to be understood as the temperature at which the amorphous or semi-crystalline polymer changes from the liquid or rubber elastic status into the hard elastic status.

The aminoplast resin have advantageously a molar mass of $M_W$=150-1000 g/mol, in particular between 150 and 600 g/mol.

Under normal conditions (room temperature, 1 bar air pressure) the resins according to the invention are present preferably as solid resins.

The resin according to the invention is obtainable in a simple two-step process.

Accordingly, the thermoplast processible, etherified aminoplast resin is obtainable by:

a) Simultaneous conversion of at least one triazine compound with at least one aldehyde and at least one alcohol, whereat the triazine compound corresponds to the general formula (I)

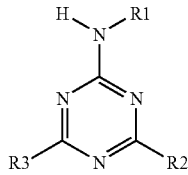

whereat
$R^2$ means $Q^1$ or a moiety of the formula $R^4$—N—$R^5$ connected with its central nitrogen atom to the triazine ring of the structure of formula (I), whereat
$Q^1$ means a linear or branched $C_1$-$C_{50}$-alkyl or a cyclic substituent in form of a $C_5$-$C_{20}$-cycloalkyl, a $C_5$-$C_{20}$-aryl, a $C_1$-$C_{20}$-alkyl substituted $C_5$-$C_{20}$-aryl, $C_2$-$C_{20}$-heterocycle, $C_2$-$C_{20}$-alkenyl substituted $C_2$-$C_{20}$-heterocycle, $C_1$-$C_{50}$-alkyl substituted $C_2$-$C_{20}$-heterocycle, a $C_2$-$C_{20}$-alkenyl, a $C_2$-$C_{20}$-alkenyl substituted $C_5$-$C_{20}$-aryl, $C_2$-$C_{12}$-alkinyl or an imide of cyclic saturated or unsaturated carboxylic acids, whereat the $C_1$-$C_{50}$-alkyl or the cyclic substituent can be interrupted by one or multiple oxygen atoms, sulphur atoms, substituted and/or unsubstituted nitrogen atoms and/or by one or multiple groups of the type —C(O)O—, —OC(O)—, —C(O)—, —NHC(O)O—, —OC(O)NH— and/or —OC(O)O—,
$R^3$ means $Q^1$ or a moiety of the formula $R^6$—N—$R^7$ connected with a nitrogen atom to the triazine ring of the structure of the formula (I),
$R^1$, $R^4$, $R^5$, $R^6$ and $R^7$ being independently from each other H or $Q_2$, whereat
$Q_2$ means in each case a linear or branched $C_1$-$C_{50}$-alkyl, $C_5$-$C_{20}$-cycloalkyl, $C_5$-$C_{20}$-aryl, $C_1$-$C_{20}$-alkyl substituted $C_5$-$C_{20}$-aryl, $C_2$-$C_{20}$-heterocycle, $C_2$-$C_{20}$-alkenyl substituted $C_2$-$C_{20}$-heterocycle, $C_1$-$C_{50}$-alkyl substituted $C_2$-$C_{20}$-heterocycle, $C_2$-$C_{20}$-alkenyl, $C_2$-$C_{20}$-alkenyl substituted $C_5$-$C_{20}$-aryl or $C_2$-$C_{12}$-alkinyl, which in each case can be interrupted by one or multiple oxygen atoms, sulphur atoms, substituted and/or unsubstituted nitrogen atoms and/or by one or multiple groups of the type —C(O)O—, —OC(O)—, —C(O)—, —NHC(O)O—, —OC(O)NH— and/or —OC(O)O— and/or can have further functional groups like —OH, —$NH_2$, —$NHR^1$, SH, halogen, and subsequent
b) removal of excess of alcohol and water by simultaneously precuring at temperatures of 80-150° C. and pressures of 100-400 mbar. Therefore, non-converted alcohol is already removed during the process.

The aminoplast resins according to the invention are therefore producible in a two-step process, whereat it is possible to omit the otherwise usual additional step of extrusion. The resin is already obtained after the removal of the excessive solvent, in particular the excessive alcohol. Due to the omission of the extrusion step the resin according to the invention is only condensated to a low degree and has therefore a broad processing window.

Advantageously, the aminotriazine compound used in step a) is selected from a group comprising melamine, $C_1$-$C_{50}$-alkyl substituted melamine, $C_5$-$C_{20}$-cycloalkyl substituted melamine, guanamine or benzoguanamine. Melamine, acetoguanamine and benzoguanamine or any mixtures thereof are in particular preferably used.

As aldehyde preferably $C_1$- to $C_{12}$-aldehydes are used, which have one or multiple aldehyde groups, in particular suitable are formaldehyde, acetaldehyde, glutaraldehyde, glyoxal or trimethylolacetaldehyde. The aldehydes can thereby be used as aqueous solution as well as pure substance. 30-50% formalin solution or and para-formaldehyde have shown to be in particular suitable.

As alcohol preferably $C_1$- to $C_{12}$-alcohols are used, which have one or multiple alcohol groups. Methanol, butanol, hexanol, butandiol, trimethylolpropane or ethoxylate are in particular suitable.

As used herein, the term "$C_1$-$C_{50}$-alkyl" refers to moieties like methyl, ethyl, n-propyl, isopropyl, n-butyl, isobutyl, s-butyl, t-butyl, amyl, t-amyl, hexyl, heptyl, octyl, nonyl decyl, undecyldodecyl, and longer chain moieties. Methyl, ethyl, propyl, isopropyl and butyl are preferred $C_1$-$C_{50}$-alkyl groups.

The term "$C_5$-$C_{20}$-cycloalkyl" comprises for instance the groups cyclopropyl, cyclopentyl, cyclohexyl, cycloheptyl and higher membered rings.

The term "$C_5$-$C_{20}$-aryl" as used herein denotes aromatic hydrocarbons, for instance phenyl, benzyl, naphtyl, or anthryl.

The term "$C_2$-$C_{20}$-heterocycle" denotes optionally substituted rings with 2-20-C-atoms which have 1 to 4 hetero atoms like for instance oxygen, sulphur and/or nitrogen, in particular nitrogen, either alone or in combination with sulphur- or oxygen-ring atoms. These rings can be saturated or completely unsaturated or partially unsaturated, whereat completely saturated rings are preferred. Preferred heterocycled rings include piperidinyl, morpholinyl, piperazinyl, 2-amino-imidazoyl, tetrahydrofurano, pyrrolo, tetrahydrothiophenyl.

The term "$C_2$-$C_{20}$-alkenyl" denotes a moiety comprising a double bond whereat it can be present substituted or unsubstituted. The stereoisomery is not important and all stereoisomers can be used for respective substituted alkenyl.

The term "$C_2$-$C_{12}$-alkinyl" as used herein denotes a moiety of the formula $C_2$-$C_{12}$—C≡C—. Examples for $C_2$-$C_{12}$-alkinyles include: ethinyl, propinyl or propargyl, 2-butinyl, 2-pentinyl, 3-pentinyl, 2-hexinyl, 3-hexinyl, 4-hexinyl, 2-heptinyl, 3-heptinyl, 4-hepinyl, 5-heptinyl, as well as octinyl, noninyl, decinyl, undecinyl, dodecinyl, as well as di- and tri-ines of straight and branched alkyl chains. Alkinyl moieties having a terminal triple bond are preferred.

The term "substituted" in combination with "alkyl", "alkenyl" etc. denotes the substitution of one or multiple atoms, usually H-atoms, by one or multiple of the following substituents, preferably by one or two of the following substituents: halogen, hydroxyl, protected hydroxyl, oxo protected oxo, $C_3$-$C_7$-cycloalkyl, phenyl, naphtyl, amino, protected amino, monosubstituted amino, protected monosubstituted amino, disubstituted amino. Further substituents are in general conceivable. The substituted alkyl groups, aryl groups, alkenyl groups, can be once or multiple times substituted and preferably once or twice with the same or different substituents.

In a preferred embodiment the molar ratio of aminotriazine compound to aldehyde in step a) has a value of 1:1.1 to 1:6, preferably 1:1.3 to 1:3.

It is furthermore of an advantage, if the molar ratio of alcohol to aminoplast former in step a) has a value of 1:25 to 15:1, preferably 1:5 to 10:1.

The amount of solids of the product formed in step a) is between 20 and 60%, preferably between 32 to 51%.

The two-step process for the production of the resin according to the invention is characterized by: a) simultaneous conversion of at least one aminotriazine compound of the general formula (I) with at least one aldehyde and at least one alcohol, and b) removal of excess alcohol and water by simultaneous precuring at temperatures of 80 150° C. and pressures of 100-400 mbar.

The conversion in step a) occurs advantageously at temperatures of 80-150° C. Thereby, the temperature can be constant during the complete conversion but also a temperature profile can be run.

When carrying out the process in a thin film evaporator the conversion occurs preferably in two thin film evaporators connected in series. A first thin film evaporator is operated at 80 to 130° C., whereas the second thin film evaporator is operated in dependency from the throughput at 130 to 150° C. In a preferred embodiment the temperature in the first thin film evaporator is 120° C. at a throughput of 50 kg/h aminoplast resin and at 135° C. in the second thin film evaporator. At a throughput of 60/h aminoplast resin the temperature in the first thin film evaporator is on the other side at 130° C. and in the second thin film evaporator at 140° C.

In step a) the pressure during conversion is preferably 1-16 bar, whereat a constant pressure can be applied during the complete conversion, but also a pressure profile can be run. The pressure is thereby dependent on the temperature since the vapour pressure of the solvent used during the conversion is adjusted and no additional pressure is applied.

In step a) advantageously a pH value of 5.3.7.8, in particular, a pH value of 5.5-6.9 exists. The adjustment of the pH value occurs preferably by the addition of a organic or inorganic acid, an ion exchange resin or a zeolite. Examples for suitable acids are hydrochloric acid, nitric acid, sulphuric acid, formic acid or acidic acid. Examples for suitable ion exchangers are chlormethylated and trimethylamin-aminated copolymers from styrene and divinylbenzene, sulphonated copolymers of styrene and divinylbenzene and m-phenylendiamin-formaldehyde-copolymers.

In an embodiment the reaction product is stabilized after step a) by increasing the pH value, in particular, preferably to pH>8.5. Examples for suitable alkalis are sodium hydroxide and potassium hydroxide.

For the conduction of process step a) stirring reactors with bottom outlet and decreasing cooler are suitable as reactors.

Suitable instruments for removal of excessive alcohol and formed water by concomitant pre-curing in step b) are for instance thin film evaporators, falling film evaporators, short path layer evaporators or evaporators for media of high viscosity of the company list.

The resins according to the invention are especially suitable for the production of fibers, fribrids, fleeces or fabrics according to spinning methods known to the person skilled in the art. The resins according to the invention can in particular be processed in the so called "melt blow" process to non-woven materials (non-woven). Furthermore, the resins according to the invention are also suitable for use as binders and/or additive in Wood Plastic Composites (WPC), pressed masses or molding materials.

As mentioned, the aminoplast resins according to the invention are in particular suitable for the production of non-woven materials, in particular fine fiber non-woven materials.

The fine fiber non-woven material from thermoplastic processible aminoplast resins, preferably melamine resins, is in particular characterized by the diameter of its constitutive fibers as well as the density of their linkage. The following parameters are defined for the description of the density of their linkage (fiber structure).

Branching Points:

A branching point is such a point in which two or more fibers continuing in their respective longitudinal direction converge in one point and are being physically connected to each other by merging. The average number of branching points per unit of area is denoted with N. This parameter is denoted with $N_{P\_mm}$ in respect to the unit of area of one square millimeter.

Branching Arms:

A branching arm is the arm of a fiber which in each case runs between two branching points and is not interrupted by any further branching points. The average number of branching arms per unit of area is denoted with $N_A$.

This parameter is denoted with $N_{A\_nm}$ in respect to the unit of area of a square millimeter.

An electron-microscopic photo of an embodiment of the fine fiber non-woven material according to the invention is exemplary shown in FIG. 1. Branching points are denoted by circles and branching arms are denoted by triangles.

For the determination of branching parameters electron-microscopic photographs of a fine fiber non-woven material can be evaluated. Thereby, branching arms and branching points of the top layer facing the observer are counted. Thereby, it is reasonable, to take the mean of the parameters, in particular the number of branching arms and the number of branching points via statistical methods.

The fine fiber non-woven material can have a network, which contains between 1 and 1000 $n_A$ branching arms and between one and 300 $n_P$ branching points per square millimeters. Such fine fiber non-woven materials are preferred, which have an average fiber diameter of 0.1 to 100 micrometers, preferably of 0.5 to 40 micrometers, further preferably of 0.5 to 20 micrometers, at most preferably from 0.5 to 10 micrometers.

The average fiber diameter is thereby the average of the fiber diameter of the fibers which were used for the determination of the branching parameters.

In one embodiment such describable fine fiber non-woven material is obtained from the thermoplastic processible aminoplast resins according to the invention.

Such a describable fine fiber non-woven material can also be obtained in a further embodiment from an etherified melamine resin as for instance described in WO 2006/100041. In contrast to the process shown there, the fine fiber non-woven material is however obtained by an improved process.

In case of the described process it is a modified melt blown process which can be in particular characterized by the amount and kind of a processing additive or the geometry of the applied spinning nozzles or the amount of blow air and temperature or the humidity or the concentration of the curing gas or the retention time in the sorption tunnel or the time and temperature control of the after-treatment or of a combination of these parameters.

The process is conducted in an apparatus which consists of multiple modules. The fibers are for instance deposited on a continuous filter band or screening drum.

Although the aminoplast resins according to the invention or the resins produced according to WO 2006/100041 can be processed thermoplastically, linkages, e.g. increase of viscosity until hardening, can occur when using them at very long retention times, which in particular appear in that spaces of the melt guiding plant parts.

It was found that this problem can be as far as possible solved by the addition of alcohols, in particular lower molecular alcohols as for instance methanol or butanol. Thus, it is of an advantage to mix lower molecular alcohols to the melt of the aminoplast resins according to the invention or to the resins produced according to WO 2006/100041 in the extruder. Through this, the viscosity of the resin is lowered and the processing stability of the resin is further increased.

By adding the lower molecular alcohols the viscosity and the softening point of the resins are lowered. The lowering of the viscosity is desirable since on the one hand the processing temperature is decreased, but on the other hand their fiber diameter can be reduced.

A lower softening point or a lower glass transition temperature $T_g$ of the resins means that the tangled layer of fine fibers adheres during deposition on the filter band in an uncontrollable manner. It is not possible to produce soft little or non-adhered non-woven materials.

It was found that by an appropriate temperature control in the melt blowing shaft the lower molecular alcohols are removed from the fine fibers and the tendency to adhere is pushed back.

Thereto the temperature is advantageously adjusted in the upper part between 100° C. and 250° C., in the lower part between 30° C. and 50° C.

In the lower part of the melt blown shaft the temperature of the fiber air mixture is increased to a temperature between 30° C. and 50° C. by admixing cold secondary air.

Excessive air can escape through the vent holes.

According to an aspect of the present invention an aminoplast resin melt, in particular a melamine resin melt, which is for instance molten in an extruder, is pressed through spinning nozzles. The nozzles are located in the tip of cones (angle of the cones of 10° to 90°), along which hot air with a temperature between 150° C. and 300° C. flows with a high velocity. The temperature of the blow air is preferably 200° C. to 250° C. The control of the relative humidity of the blow air has thereby an important influence on the subsequent network ability of the forming non-woven material.

According to a further aspect of the invention, spinning nozzles are used, which are characterized by a capillary diameter of 0.2 mm to 1 mm, preferably of 0.4 mm to 0.7 mm, at a capillary length of ca. 1 mm. These nozzle parameters allow the spinning of thinner fibers.

Such fibers of a smaller diameter provide in combination with the specific room structure which is characterized by the previously mentioned values for branching arms and branching points per unit of area, non-woven material of noticeably increased elasticity.

Dry air is advantageously used in this process. In presence of wet air a high compression of the fibers occurs as a result, accompanied by loss of beneficial mechanical properties of the non-woven material.

The fine fibers are blown with the blow air, which mixes with the surrounding air, in a turbulence shaft onto a filter band as fiber separator. The air is sucked with a suction blower, which is located beneath the filter band. The fine fibers are separated from the air stream by the filter band and deposited on the filter band as a tangled layer to loose non-woven material. The weighted power of the air suction is many times that of the blow air amount. Thereby, the ratio of blow air and sucked amount is adjusted such that the fine fibers can cool down to ca. 50° C.

The formed fine fibers have a disordered, small-scale frizzle structure, which promotes the formation and cohesion of the non-woven material.

The loose non-woven material is optionally compressed and transferred via a filter band into a sorption module. In a sorption tunnel the fine fiber tangled layer is flown through by circulating air containing gaseous HCl. Thereby, a defined HCl amount is taken up by the fine fibers. The HCl amount of the circulating air is 0.0 to 5 Vol %, preferably 0.0 to 3.5 Vol %, mostly preferred 0.0 to 0.5 Vol %. The HCl concentration in the blowing chamber is measured in real time and is controlled by changing the dosed amount HCl.

The sorption tunnel is run with a low underpressure in order to secure that no HCl-containing air escapes. This underpressure results in that air is sucked in at the entrance and exit openings of the non-woven material of the sorption and neutralization tunnel. Since air humidity can lead to an uncontrolled adhesion of the non-woven material chambers can be located at the entrance and exit openings of the non-woven material of the sorption or neutralization tunnel, which are charged with dry air.

After passing through the sorption tunnel the fine fiber tangled layer is transported further on the filter band into the neutralization tunnel. There, the non-woven material is flown through by dried air, which contains a according to a preferred embodiment ammonia for neutralization. Through this, HCl located between the fine fibers is being neutralized.

The fine fiber tangled layer produced according to the above-mentioned parameters is after-treated in a further step. Thereby, the tangled layer is exposed in two steps to a higher temperature in a hardening tunnel according to a pre-set regimen over a controlled time.

The overall retention time in the hardening tunnel is thereby between 2 and 10 minutes. The temperature is increased after entering the hardening tunnel within a few seconds at first stepwise up to 100° C. to 140° C. and subsequently in a further following step increased again within a few seconds up to 200 to 230° C. Thereby the fine fiber tangled layer is exposed to the first temperature between 1 and 5 minutes and to the second, higher temperature step between 1 and 5 minutes.

Due to the temperature increase methanol is separated from the fine fiber tangled layer consisting of non-hardened melamine resin. Through this, the fine fibers soften. Due to the softening of the fibers the self-adherence of the tangled layer and therefore the formation of self-compressed non-woven structures is supported by an appropriate process control. Due to the increase of temperature in the second temperature step the fine fibers cross-linked further and the mechanical stability of the forming non-woven material structure increases.

In a further process step, which can also be conducted as a spatial and/or timely separated after-treatment step, it is expedient to transfer the fine fiber non-woven material formed in a hardening tunnel by a filter band into a temper tunnel. There, the temperature is increased stepwise to a final temperature of 240-300° C. This temperature increase is preferably carried out over 2 to 20 minutes; thereby the retention time in the temper tunnel is between 2 and 20 minutes. For achieving a high retention time, the temper tunnel can be designed as multi-stage apparatus. In this last step the produced fine fiber non-woven material cures completely.

According to a preferred embodiment of the present invention the fine fiber non-woven material obtained by melt blowing, HCl-hardening, temperature-hardening and tempering is further compressed by a needling step and subsequently wound onto rolls.

An important parameter for the properties of the obtained non-woven material is the concentration of HCl in the sorption module as well as the retention time of the produced fine fiber tangled layer in this module. The HCl concentration in the circulating air as well as the retention time of the tangled layer in said module are decisive for the thermal toughness of the produced fine fiber material. This is calculated by thermal-gravimetric determination. The highest decomposition temperature of 400 to 405° C. is achieved with a low HCl concentration (0 to 0.3 Vol %) and a short retention time in the HCl module (ca. 1 minute).

The tempering step of 2 to 20 minutes results in that the non-woven material experienced a clear increase of its tear strength related to its fineness of about 30% compared to the untreated non-woven material.

It is furthermore surprising that such produced non-woven material can be needled in contrast to the non-woven materials known from the prior art.

BRIEF DESCRIPTION OF THE DRAWINGS

The invention is further characterized by the following Figures and Examples. It shows.

EXAMPLES

Example 1

Figure 1:
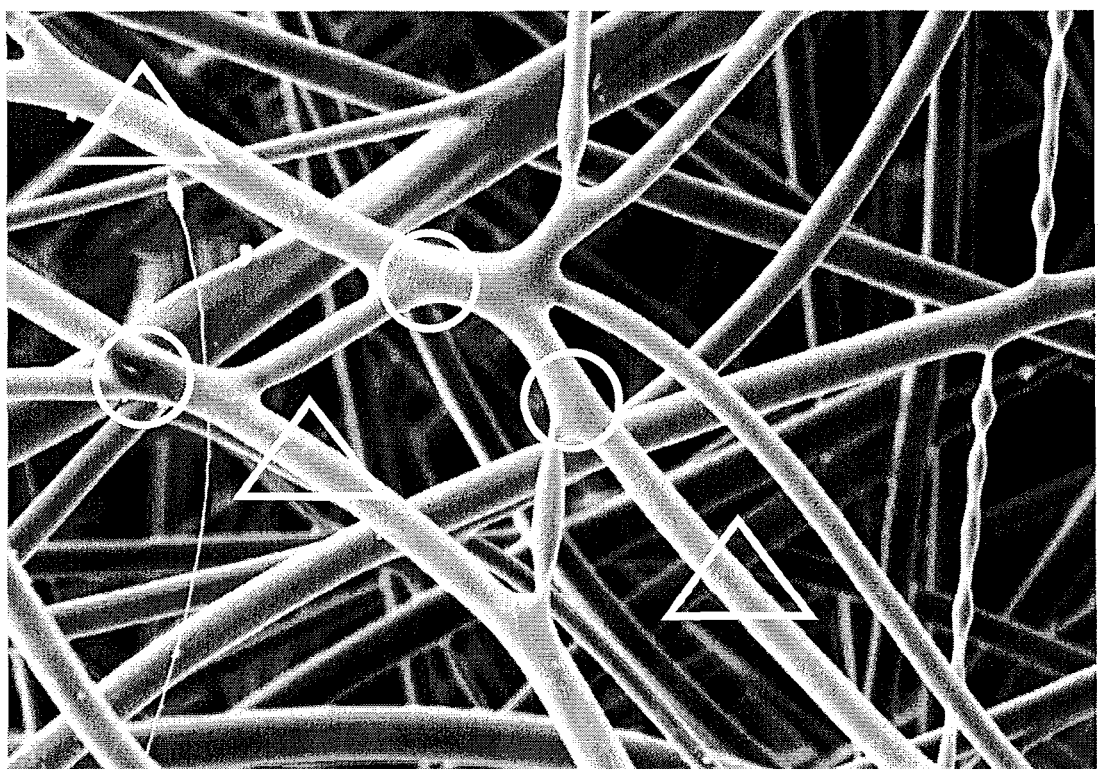
FIG. 1 a scanning electron microscopic photograph (REM) of an embodiment of the fine fiber non-woven material according to the invention. Branching points are designated by circles and branching arms are designated by triangles.

Production of a First Thermoplastic Processible Aminoplast Resin 1.1 Production of the Polyaminotriazineether In a 100 l stirring reactor a reaction mixture is obtained by addition of 20.0 kg melamine 38.1 kg methanol and 25.7 kg formaldehyde (37%) as aldehyde component methanol-stabilized and 0.08 kg p-toluolsulfonic acid. This reaction mixture is converted at a reaction temperature of 90° C. and a reaction time of 35 min, whereat 25 min elapse till the clearing point and the further cooking time is 10 min after the clearing point. The progress of the reaction is concomitantly measured by NIR at 220 nm. After a complete reaction time of 35 min it is cooled down to 40° C. The pH value is now typically at 6.8. By addition of 20% potassium hydroxide a pH value of 10 is adjusted. The amount of solids is 38%. The obtained resin sirup is stored at room temperature.

1.2 Concentrating of the Polyaminotriazineether

The etherified aminotriazine resin condensate dissolved in water-methanol-mixture is transferred from the storage container by a membrane pump with 50 kg/h into a first vacuum thin film evaporator, in which the solution of the etherified aminotriazine resin condensate is concentrated at 125° C. and 150 mbar to a highly concentrated aminotrianzine resin solution, which has a solid amount of 60 mass % and an amount of water/methanol of 40 mass %. Subsequently, the highly concentrated solution of the etherified aminotriazine resin is transferred into a second vacuum thin film evaporator and concentrated at 135° C. to a melt, which has an amount of solids of 99 mass % and an amount of water/methanol of 1 mass %. This melt is immediately pumped after the second vacuum thin film evaporator with melt pump to drum granulator and is cooled there to room temperature. Flakes of ca. 10 mm heights and 0.5 mm thickness are formed. The glass transition temperature is at 60° C. The molecular weight is at Mw=300 g/mol. The viscosity of the obtained resins is at 130° C. ca. 30 to 40 Pas and increases over a time period of 50 min to maximal 70 Pas.

Example 2

Production of a Second Thermoplast Processible Aminoplast Resin 2.1 Production of a Polyaminotriazineether In a 100 l stirring reactor a reaction mixture is obtained by addition of 20.0 kg melamine, 0.82 kg trimethyolopropane and 25.7 kg formaldehyde (37%) methanol-stabilized as aldehyde component and 0.08 kg p-toluolsulphonic acid. This reaction mixture is converted at a reaction temperature of 90° C. and a total reaction time of 35 min, whereat 25 min elapse until the clearing point and the further reaction time after the clearing point is 10 min. The reaction progress is concomitant measured by NIR at 220 nm. After a total reaction time of 35 min it is cooled down to 40° C. The pH value is now at 6.8. By addition of 20% potassium hydroxide a pH value of 10 is adjusted. The amount of solids is 39%. This obtained resin sirup is stored at room temperature.

2.2. Concentrating the Polyaminotriazineether

The etherified aminotriazine resin condensate dissolved in water-methanol-mixture is transferred from the stirring container by the means of a membrane pump into a first vacuum thin film evaporator with 50 kg/h in which the solution of the etherified aminotriazine resin condensate is concentrated at 125° C. and 150 mbar to a highly concentrated aminotriazine resin solution, which has an amount of solids of 60 mass % and an amount of water/methanol of 40 mass %. Subsequently, the highly concentrated solution of the etherified aminotriazine resin is transferred into a second vacuum thin film evaporator and is concentrated at 135° C. to a melt, which has an amount of solids of 99 mass % and an amount of water/methanol of 1 mass %. This melt is immediately pumped after the second vacuum this film evaporator with a melt pump to a drum granulator and is cooled there to room temperature. Flakes of ca. 10 mm height and 0.5 mm thickness are formed. The glass transition temperature is at 50° C. The molecular weight is Mw=400 g/mol. The viscosity of the obtained resins is at 130° C. ca. 15 to 20 Pas and increases over a time period of 55 min to maximum 60 Pas.

Example 3

Production of a Third Thermoplastic Processible Aminoplast Resin 3.1. Production of a Polyaminotriazineether In a 100 l stirring reactor a reaction mixture is obtained after addition of 19.15 kg melamine, 31.0 kg methanol, 0.726 kg trimethyolopropane and 30.8 kg formaldehyde (37%) methanol-stabilized as aldehyde component and 0.08 kg p-toluolsulphonic acid. This reaction mixture is converted at a reaction temperature of 90° C. and a total reaction time of 45 min, whereat 50 min elapse until the clearing point and the further reaction time is 30 min after the clearing point. The reaction progress is concomitant determined by NIR at 220 nm. After the complete reaction time of 45 min it is cooled down to 40° C. The pH value is now at 6.6. By addition of 20% potassium hydroxide a pH value of 10 is adjusted. The amount of solids is 34%. This obtained resin sirup is stored at room temperature.

3.2. Concentrating of the Polyaminotriazineether

The etherified aminotriazine resin condensate dissolved in a water-methanol-mixture is transferred from the storage container by the means of a membrane pump into a first vacuum thin film evaporator with 50 kg/h, in which the solution of the etherified aminotriazine resin condensate is concentrated at 125° C. and 150 mbar to a highly concentrated aminotriazine resin solution which has an amount of solids of 60 mass % and an amount of water/methanol of 40 mass %. Subsequently, the highly concentrated solution of the etherified aminotriazine resin is transferred into a second vacuum thin film evaporator and is concentrated at 135° C. to a melt which has an amount of solids of 99% and an amount of water/methanol of 1 mass %. This melt is immediately pumped after the second vacuum thin film evaporator with a melt pump to a drum granulator and is cooled there to room temperature. Flakes of ca. 10 mm height and 0.5 mm thickness are formed. The glass transition temperature is 50° C. The molecular weight is Mw=600 g/mol. The viscosity of the obtained resin is at 130° C. ca. 15 to 20 Pas and increases over a time period of 40 min to maximal 65 Pas.

Example 4

Production of a Fourth Thermoplastic Processible Aminoplast Resin 4.1. Production of the Polyaminotriazineether In a 100 l stirring reactor a reaction mixture is formed by addition of 37.9 kg melamine, 12.7 kg fully desalted water, 8.93 kg trimethyolopropane, 5.16 kg aqueous 0.75% potassium hydroxide and 34.3 kg form aldehyde (36.5%) melamin stabilized as aldehyde component.

This reaction mixture is converted at a reaction temperature of 115° C. and a total reaction time of 25 min, whereat the clearing point occurs at arriving at the reaction temperature (determined by NIR 220 nm) and the further reaction time is 25 min after the clearing point. The reaction pressure is 1.4 bar.

After the total reaction time of 20 min it is cooled down to 40° C. The pH value is now at 9.3. The amount of solids is 59% and the water tolerance is 0.9-1.1. The obtained resin sirup can be stored at room temperature for a maximum of 7 days.

4.2. Concentrating of the Polyaminotriazineether

The etherified aminotriazine resin condensate dissolved in water-methanol-mixture is transferred from the storage container by the means of a membrane pump into a first vacuum thin film evaporator with 35 kg/h, in which the solution of the etherified aminotriazine resin condensate is concentrated at 130° C. and 950 mbar to a highly concentrated aminotriazine resin solution, which has an amount of solids of 75 mass % and an amount of water of 25 mass %.

Subsequently, the highly concentrated solution of the aminotriazine resin is transferred into a second vacuum thin film evaporator and concentrated at 135° C. to a melt, which has an amount of solids of 98.5-99.0 mass % and an amount of water of 1.0-1.5 mass %.

This melt is immediately pumped after the second vacuum thin film evaporator with a melt pump to a drum granulator and is there cooled to room temperature. Flakes of ca. 10 mm height and 0.5 mm thickness are formed. The glass transition temperature is 60° C. The molecular weights are at Mw=200 g/mol. The viscosity of the obtained resins is at 130° C. ca. 10 to 15 Pas and increases over a time period of 30 min to maximal 75 Pas.

Example 5

Production of Pressure Elastic Duroplastic Non-Woven Material

In a twin screw extruder "Eurolab 16" of the company THERMO PRISM the resin according to example 1 is melted at a working temperature of 130° C., the melt is transferred via a tunnel to three four times spinning pumps and subsequently pressed through 12 melt blown single nozzles, which are arranged a width of 30 cm, with a total through put of 24.1 g/min. The jet capillaries have a diameter of 0.7 mm and a length of 5 mm. The blow air has a temperature of 215° C. and a pre-pressure of 2 bars. The mixture of blow air and formed melamine resin fibers leaving the melt blown nozzles is guided in a distance of 55 cm onto a filter band moving with a velocity of 1.2 m/min, and the fibers are deposited to a loose non-woven material. The non-woven material is subsequently flown through by dry air containing 0.5% HCl-gas for 30 s and subsequently the HCl-gas/air mixture located in the fiber spaces is exchanged by air, which has a relative humidity of maximal 5%. After a break of 20 min the non-woven material is heated within 30 min from room temperature to 260° C. and is thereby cured. The obtained non-woven material body is strongly cross-linked and contains a pronounced pressure elastic behaviour with a recovery of 100% at a load of 10 g/cm$^2$ for one minute.

The production of the HIPE®ESIN MER-non-woven material occurs at a room air of 23° C. and 42% relative air humidity. The structure of the cured non-woven material body is shown by the following REM-photograph (FIG. 1). According to the above-described method the number branching points is 153/mm$^2$; the number of branching arms is 476/mm$^2$.

FIG. 1 shows a REM-photograph (200 times enlargement) of a pattern according to example 1. The fibers have a diameter of ca. 10 μm and smaller. As an example, the branching points are symbolized by circles and the branching arms are symbolized by triangles.

Example 6

Production of a Textile Duroplastic Non-Woven Material

In a twin screw extruder "Eurolab 16" of the company THERMO PRISM a resin according to example 3 is melted at a working temperature of 135° C., the melt is transferred via a tunnel to three four times spinning pumps and is subsequently pressed through 12 melt blown single nozzles, which are arranged over a width of 30 cm, with a total through put of 21 g/min. The nozzle capillaries have a diameter of 0.4 mm and a length of 5 mm. The blow air has a temperature of 213° C. and a pre-pressure of 3 bar. The mixture of blow air and the formed HIPE® ESIN MER-fibers leaving the melt blown nozzles is guided in a distance of 80 cm to a filter band moving with a velocity of 0.7 m/min and the HIPE®ESIN MER-fibers are deposited to a loose non-woven material. The non-woven material is subsequently flown through by dry air containing 0.9% HCl-gas for 55 sec. and afterwards the HCl-gas/air mixture located in the fiber spaces is exchanged by air, which has a relative humidity of maximal 5%. Subsequently, the non-woven material is flown through by air containing 1% ammonia gas for 30 sec., enters then a belt dryer "Syntronic 100" and is heated in the first step to 110° C. and in a second step to 215° C. and cured. A tempering for 10 minutes at 250° C. and 280° C. follows, respectively. The non-woven materials have a loose structure, are only adhered at a few fiber crossing points and are characterized by a textile grip. They can be compressed by needling. The cured fibers have an average titer of 1.66 dtex.

The fiber stability depends on the thermal curing and tempering as listed in the following table.

| Curing/Tempering temperature (° C.) | Extension (%) | Stability related to fineness (cN/tex) |
| --- | --- | --- |
| 215 | 5.84 | 13.9 |
| 250 | 5.77 | 16.3 |
| 280 | 5.70 | 19.1 |

The production of the non-woven material occurs at a room air of 26° C. and 31% relative air humidity.

Figure 2:
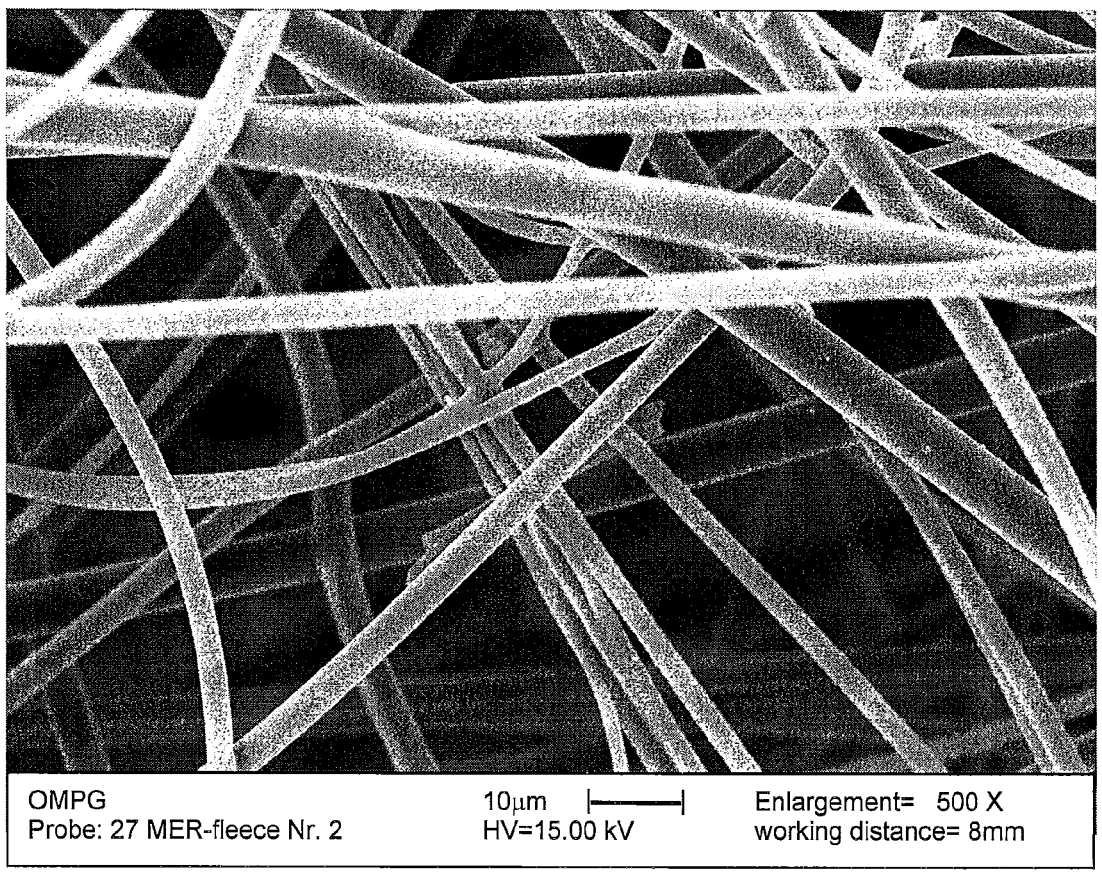
FIG. 2 a further scanning electron microscopic photograph (REM) of an embodiment of the fine fiber non-woven material according to the invention.
Figure 3:
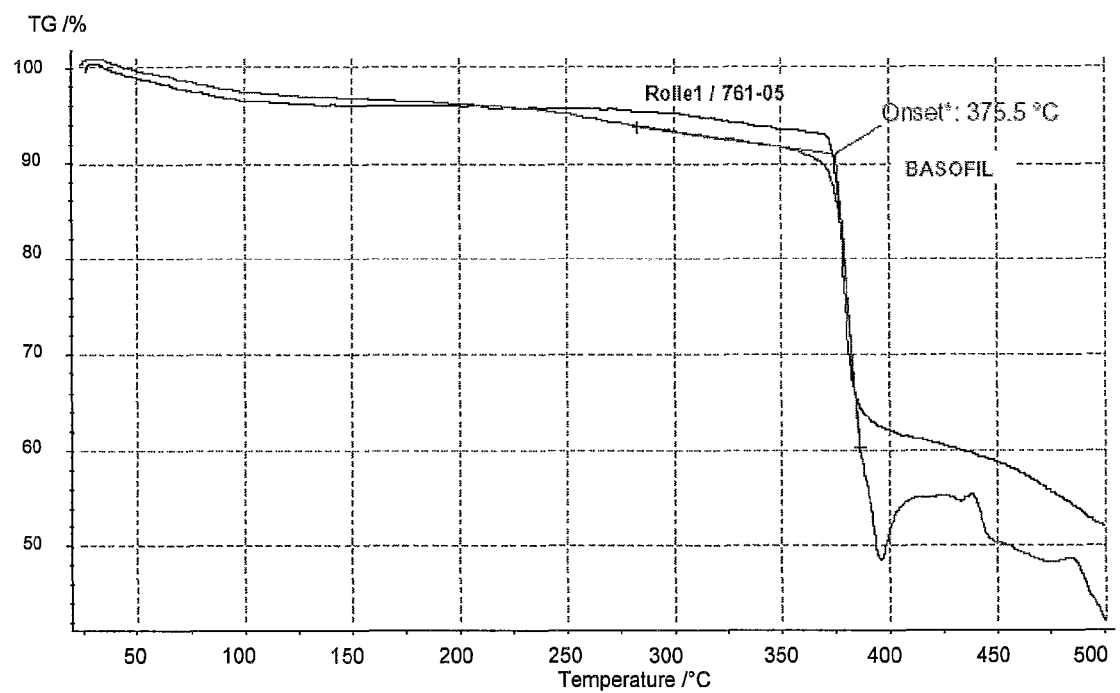
FIG. 3 the thermal gravimetrical determination of the decomposing temperature of the non-woven material produced in example 2.

The structure of the cured non-woven material is shown in the REM-photograph (500 times enlargement) in FIG. 2. The average fiber size is thereby under 10 μm, in particular at ca. 5 μm.

The number of branching points determined according to the above described method is 34/mm$^2$; the number of branching arms is 102/mm$^2$.

Due to the mentioned additional thermal treatment of the non-woven material (sample 30×30 cm) the tear strength in respect to its fineness increased of about one third, as shown in the above table. In parallel, the titer and extension are only reduced to a small amount.

The thermal stability of the sample from example 2 tempered at 280° C. is determined by thermal gravimetry. Thereby, the decomposition temperature is 387° C.; the loss of mass in the range of 200° C. to 387° C. is ca. 4.8%

Example 7

Production of a Non-Woven Material with Addition of an Alcohol to the Resin Melt In a twin screw extruder "Eurolab 16" of the company THERMO PRISM a HIPE®ESIN MER-granulate is obtained according to WO 2006/100041 melted together with a melamine-formaldehyde resin in a ratio of melamine to formaldehyde of 1:2.5 at a working temperature 125° C. and liquid butanol is transported tunnel into the melt stream. The resin melt is thoroughly mixed with butanol by suitable screw elements and is fed via a melt to three four times spinning pumps and subsequently pressed through 12 melt blown single nozzles which are arranged over a width of 30 cm with a total through put of 24.1 g/min. The nozzle capillaries have a diameter of 0.7 mm and a length of 5 mm. The blow air has a temperature of 215° C. and a pre-pressure of two bars.

Figure 7:
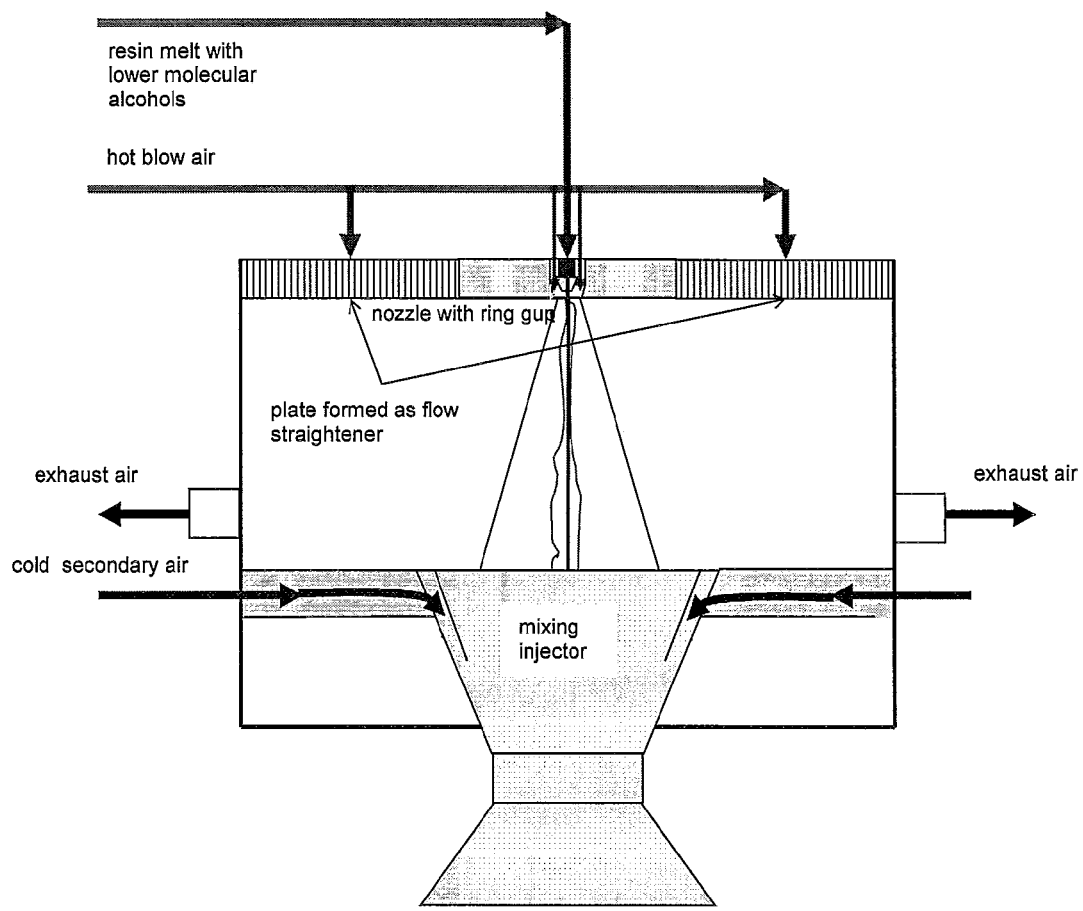
FIG. 7 a schematic view of the melt blow shaft according to an embodiment.

For stabilizing the blow air/fiber stream also hot blow air (same process conditions) is added via plates formed as flow straightener beside the nozzle row (see FIG. 7).

Excessive air can escape via exhaust air openings. In a small distance (10 cm to 30 cm) from the nozzle an injector is located in which the blow air/fiber stream is sucked with cold, dry secondary air and cooled to ca. 45° C. (see FIG. 7).

The mixture of air and the formed melamine resin fibers leaving the injector is guided to a filter band moving with a velocity of 1.2 m/min and the fibers are deposited to a non-woven material. The non-woven material is subsequently flown trough for 30 s by dry air containing 0.5% HCl-gas and subsequently the HCl-gas/air mixture located in the fiber spaces is replaced by air having a maximum of 5% relative humidity. After a resting pause of 20 min the non-woven material is heated within 30 min from room temperature to 260° C. and is thereby cured. The obtained non-woven material body is strongly cross-linked and has a pronounced pressure-elastic behaviour with a recovery of 100% at a one minute load of 10 g/cm$^2$.

The production of the HIPE® ESIN MER-non-woven material occurs at a room air of 23° C. and 42% relative humidity.

Figure 4:
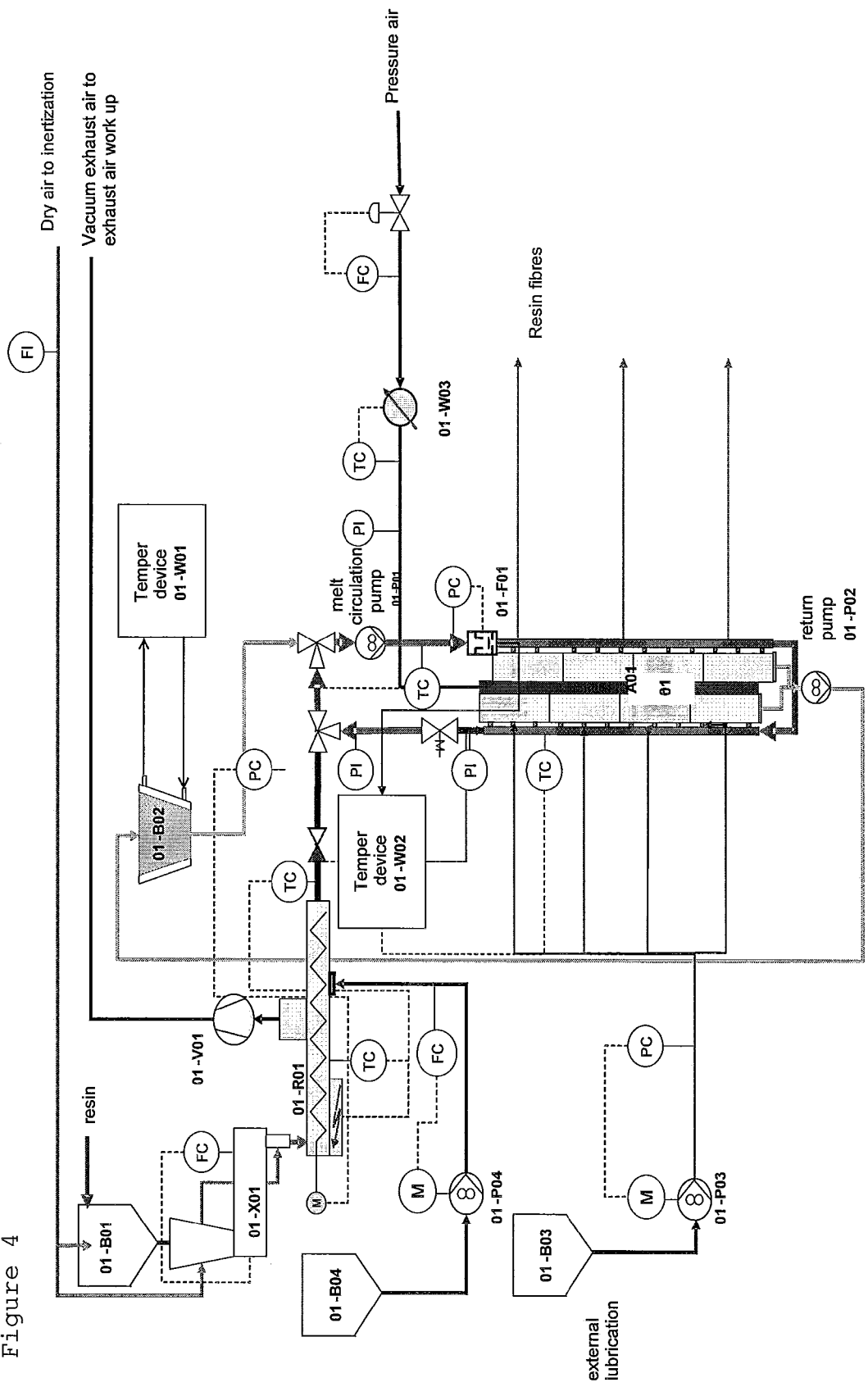
FIG. 4 a flow scheme of an embodiment of a spinning apparatus with a spinning module.

An embodiment of a spinning device is shown in FIG. 4 which comprises a spinning module which is also amongst others suitable for the production of the fine fiber non-woven materials described before and in the described process. It is pointed out that the embodiments of the spinning device and the spinning module are not restricted to the described fine fiber non-woven materials and the described processes.

In an embodiment a resin for instance of the type "HIPE® ESIN MER-2.5F" is obtained according to WO 2006/100041 delivered in form of flakes easy to dose with average dimensions L/H/B of 5/5/0.5 in air-tight bags or big-bags and stored in a stock for solids.

The bags or big-bags are emptied in a temporary storage container (01-B01). The size of the temporary storage container is selected such that it does not have to be refilled at night.

The MER is transported by a gravimetrical dosage device (01-x01) from the temporary storage container into a twin screw extruder (01-R01) and is melted there. Since the resin can contain inhomogenities the screw of the extruder contains common homogenizing elements.

The MIR is hygroscopic. In the presence of water non-desired hydrolytic reactions occur. In order to avoid the uptake of humidity, all devices in which the resin may come into contact with surrounding air as for instance the temporary storage container (01-B01) and the feed hopper of the gravimetrical dosage and extruder are overlaid with dry air.

A tool with a concentric drilling (transition from 8 to 0) is located at the exit of the extruder in which the MER-melt is transported into the entrance pipe of the melt pump. The pump 01-P01 transports the melt through the melt filter 01-F01 in a cycle to the modules of the spinning manifold.

A continuous working melt filter 01-F01 is arranged after the pump 01-P01 with which impurities which have either been included in the resin being delivered or have been formed in the melt guiding system of the spinning device are discharged from the melt stream. Since the melt is run in a cycle, it is important to avoid an enrichment of impurities and to discharge impurities.

In the circuit pipe (emphasized by bold characters in FIG. 4) a reducing valve is installed with which a pre-pressure>20 bar can be kept before each melting pump.

The component currents are transported from the melt circular pipeline to the modules of the spinning manifolds in the shortest manner. The MER-melt is pressed by the melt pumps (type: planet wheel pump with 4 planet wheels) of the spinning manifold through the downstream nozzles).

In front of each nozzle a melt filter is located which retains further impurities (gel particles).

The nozzles are located in a sharp cone (angle of 10° to 90°) along which the hot air (temperature between 150° C. and 300° C.) flows with a velocity for instance between 0.1 and 5 m/s, in particular between 0.5 and 2 m/s. In the present case a velocity of 1 m/s is applied.

The cones are thermally insulated against the blow air. Through this it is possible to increase the temperature of the blow air which blows the melt to fine fibers, above the curing temperature of the MER whereby in particular fine titer fibers are formed without a clogging of the nozzles.

Dry pressure air is used as blow air. The blow air is heated with a heat exchanger 01-W03 to a temperature of 200° C. to 300° C. The temperature of the blow air is adjusted.

Figure 5:
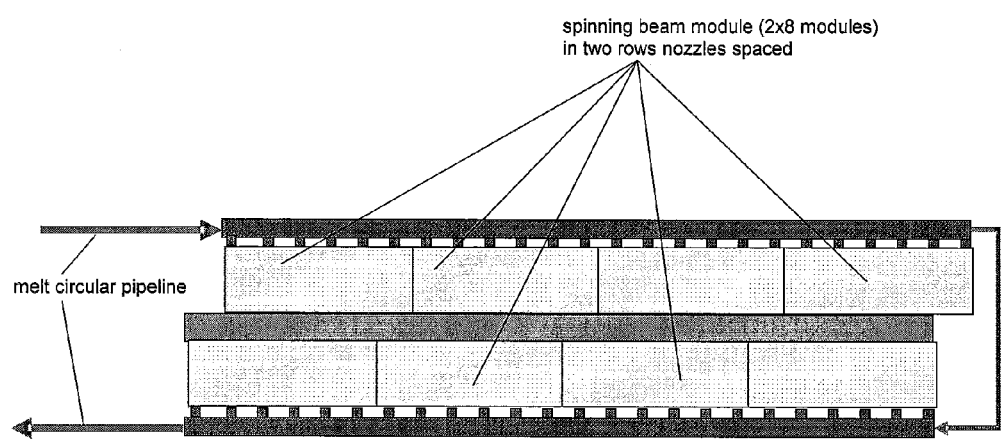
FIG. 5 a schematic view of the spinning manifold.

A spinning manifold is shown schematically in FIG. 5 (rotated by 90° in contrast to FIG. 4).

An embodiment of a spinning manifold consists of singular modules with a length of 30 cm, respectively. In FIG. 5 two rows with each having four modules are shown which are arranged in succession. The nozzles of the modules are arranged in a shifted manner to each other. The melt supply of the singular modules occurs via the circular pipe already been shown in FIG. 4 which is passed through by the melt with high velocity.

Figure 6:
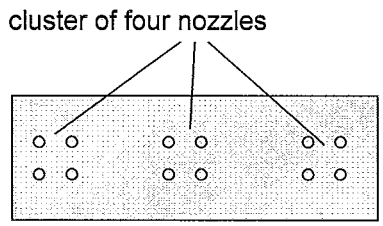
FIG. 6 a view of an embodiment of the spinning manifold from below.
Figure 6:
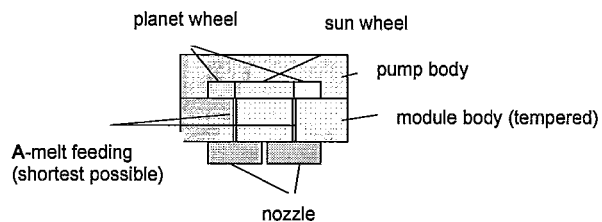

As can be seen in FIG. 6 the melt pump is designed as planet wheel pump in this embodiment. Each of the melt pumps has a sun wheel and four planet wheels so that in total four pump mechanisms are present.

A melt pump mechanism is arranged to each of the nozzles shown here only schematically. The nozzles are arranged in a type of cluster of four nozzles per planet wheel pump, respectively, whereat the nozzles are not located on a straight line.

An embodiment of a part of the spinning device is shown in FIG. 6, namely a spinning module from below and from the side. The spinning module consists of three planet wheel spinning pumps with four pairs of gear, respectively, of which melt pipes of equal length and designated with A lead to the spinning nozzles. The four spinning nozzles which are arranged in each case to one planet wheel pump are located equidistantly on a circular arc.

In FIG. 7 an embodiment of a melt blow shaft is shown in which the spinning manifold is assembled. In order to stabilize the blow air/fiber stream also hot blow air (same process conditions) is added via plates formed as flow straightener adjacent to the nozzle row assembled to the spinning manifold. Excess air can escape via the exhaust air openings. In a small distance (10 cm to 30 cm) from the nozzle an injector is located in which the blow air/fiber stream is sucked with cold dry secondary air and cooled to circa 45° C.

The mixture of air and formed melamine resin fibers leaving the injector is transferred to a bell chain moving with a velocity of 1.2 m/min and the fibers are deposited to a loose non-woven material.

The invention claimed is:

1. A thermoplastic processable etherified aminoplast resin made by the steps of:
(a) simultaneous conversion of at least one triazine compound with at least one aldehyde and at least one alcohol, wherein the triazine compound corresponds to the general formula (I)

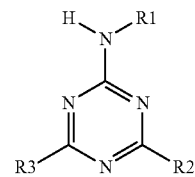

wherein
$R^2$ means $Q^1$ or a moiety of the formula $R^4$—N—$R^5$ connected with its central nitrogen atom to the triazine ring of the structure of formula (I), wherein
$Q^1$ means a linear or branched $C_1$-$C_{50}$-alkyl or a cyclic substituent in form of a $C_5$-$C_{20}$-cycloalkyl, a $C_5$-$C_{20}$-aryl, a $C_1$-$C_{20}$-alkyl substituted $C_5$-$C_{20}$-aryl, $C_2$-$C_{20}$-heterocycle, $C_2$-$C_{20}$-alkenyl substituted $C_2$-$C_{20}$-heterocycle, $C_1$-$C_{50}$-alkyl substituted $C_2$-$C_{20}$-heterocycle, a $C_2$-$C_{20}$-alkenyl, a $C_2$-$C_{20}$-alkenyl substituted $C_5$-$C_{20}$-aryl, $C_2$-$C_{12}$-alkinyl or an imide of cyclic saturated or unsaturated carboxylic acids, whereat the $C_1$-$C_{50}$-alkyl or the cyclic substituent can be interrupted by one or multiple oxygen atoms, sulphur atoms, substituted and/or unsubstituted nitrogen atoms and/or by one or multiple groups of the type —C(O)O—, —OC(O)—, —C(O)—, —NHC(O)O—, —OC(O)NH— and/or —OC(O)O—,
$R^3$ means $Q^1$ or a moiety of the formula $R^6$—N—$R^7$ connected with a nitrogen atom to the triazine ring of the structure of the formula (I),
$R^1$, $R^4$, $R^5$, $R^6$ and $R^7$ are independently from each other H or $Q_2$, and
$Q_2$ means in each case a linear or branched $C_1$-$C_{50}$-alkyl, $C_5$-$C_{20}$-cycloalkyl, $C_5$-$C_{20}$-aryl, $C_1$-$C_{20}$-alkyl substituted $C_5$-$C_{20}$-aryl, $C_2$-$C_{20}$-heterocycle, $C_2$-$C_{20}$-alkenyl substituted $C_2$-$C_{20}$-heterocycle, $C_1$-$C_{50}$-alkyl substituted $C_2$-$C_{20}$-heterocycle, $C_2$-$C_{20}$-alkenyl, $C_2$-$C_{20}$-alkenyl substituted $C_5$-$C_{20}$-aryl or $C_2$-$C_{12}$-alkinyl, which in each case can be interrupted by one or multiple oxygen atoms, sulphur atoms, substituted and/or unsubstituted nitrogen atoms and/or by one or multiple groups of the type —C(O)O—, —OC(O)—, —C(O)—, —NHC(O)O—, —OC(O)NH— and/or —OC(O)O— and/or can have further functional groups like —OH, —$NH_2$, —$NHR^1$, SH, halogen, and
(b) subsequent removal of excess of alcohol and water by simultaneously precuring at temperatures of 80-150° C. and pressures of 100-400 mbar,
wherein the removal of excess alcohol and water as well as the simultaneous precuring occur in two thin film evaporators connected in series, wherein a first thin film evaporator is operated at 80 to 130° C. and the second thin film evaporator is operated in dependency from the throughput at 130 to 150° C., so that a solid resin is obtained and with said aminoplast resin having:
a viscosity between 3 to 100 Pas at a temperature of 130° C. over a time period of at least 25 min,
a glass transition temperature $T_G$ between 40° C. and 80° C., and
a molar mass of $M_W$=150-1000 g/mol.

2. The aminoplast resin according to claim 1, having a glass transition temperature $T_G$ between 45° C. and 65° C.

3. The aminoplast resin according to claim 1, having a molar mass between 150 and 600 g/mol.

4. The aminoplast resin according to claim 1, wherein the aminotriazine compound used in step (a) is selected from a group comprising melamine, $C_1$-$C_{50}$-alkyl substituted melamine, $C_5$-$C_{20}$-cycloalkyl substituted melamine, guanamine or benzoguanamine.

5. The aminoplast resin according to claim 1, wherein the conversion in step (a) is carried out at a temperature of 80-150° C., at a pressure of 1-16 bar and a pH value of 5.3-7.8, and that the reaction product of step (a) is stabilized by increasing the pH value, preferably to a value larger than 8.5.

6. The aminoplast resin according to claim 5, wherein the conversion in step (a) is carried out at a pH value of 5.5 to 7.5.

7. The aminoplast resin according to claim 1, wherein the molar ratio of aminotriazine compound to aldehyde in step (a) has a value of 1:1.1 to 1:6, and that the molar ratio of alcohol to the aminotriazine compound in step (a) has a value of 1:25 to 15:1.

8. The aminoplast resin according to claim 7, wherein the molar ratio of aminotriazine compound to aldehyde in step (a) has a value of 1:1.3 to 1:3.

9. The aminoplast resin according to claim 7, wherein the molar ratio of alcohol to the aminoplast former in step (a) has a value of 1:5 to 10:1.

10. The aminoplast resin according to claim 1, wherein the removal of excess alcohol and water as well as the simultaneous precuring occurs in one or multiple thin layer evaporators, falling film evaporators, short path layer evaporators or evaporators for media of high viscosity.

11. A fine fiber non-woven material obtainable from a thermoplastic processable aminoplast resin according to claim 1, wherein a textile area of fibers of aminoplast resins, which have an average fiber diameter from 0.1 to 100 μm and between 1 and 1000 branching arms ($n_A$) and between 1 and 300 branching points ($n_P$) per square millimeter, and wherein the fine fiber non-woven material has a maximal decomposition temperature of up to 405° C.

12. The fine fiber non-woven material according to claim 11, having an average fiber diameter of 0.5 to 40 micrometers.

13. The fine fiber non-woven material according to claim 11, having an average fiber diameter of 0.5 to 20 micrometers.

14. The fine fiber non-woven material obtainable from a thermoplastic processable aminoplast resin according to claim 11, wherein the aminoplastic resins are melamine resins.

15. A process for the production of duroplastic fine fiber non-woven material in which a melt of an aminoplast resin, is pressed through spinning nozzles, wherein
the melt leaving at the outlet end at which the melt leaves the spinning nozzles is blown to fine fibers by hot air emitted in spatial proximity to these outlet ends of the spinning nozzles,
the fine fibers are separated from the air stream and deposited to a non-woven material consisting of tangled layer,
subsequently, the non-woven material is treated with a media causing a three-dimensional cross-linking and subsequently a neutralization step occurs, whereat the non-woven material is treated with ammonia in the neutralization step,
in a subsequent thermal after-treatment the fine fibers are glued to each other and/or hardened in the non-woven material, and
the thermal after-treatment comprises two steps, whereat in a first step the non-woven material is exposed over 1 to 5 minutes to a temperature of 100° C. to 140° C., and the non-woven material is then exposed in a second step over 1 to 5 minutes to a temperature of 200-230° C.

16. The process according to claim 15, wherein an alcohol, is added to the melt of the aminoplast resin before the pressing through the spinning nozzles.

17. The process according to claim 16, wherein the alcohol is a lower molecular alcohol.

18. The process according to claim 15, wherein the thermal cured non-woven material is exposed in an additional tempering step over 2 to 20 minutes to a temperature of 240 to 300° C.

19. The process according to claim 15, wherein the fine fibers are compressed after deposition from the air stream.

20. The process according to claim 15, wherein the air surrounding the non-woven material has a defined air humidity of 42% or less.

21. The process according to claim 15, wherein the treatment with a media causing a cross-linking occurs by treatment with a mixture of air and gaseous HCl of 0.4 Vol-% to 5 Vol-% HCl.

22. The process for the production of duroplastic fine fiber non-woven material of claim 15, wherein the aminoplast resin is a melamine resin.

* * * * *

UNITED STATES PATENT AND TRADEMARK OFFICE
CERTIFICATE OF CORRECTION

PATENT NO. : 8,722,779 B2
APPLICATION NO. : 12/682375
DATED : May 13, 2014
INVENTOR(S) : Panzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 826 days.

Signed and Sealed this
Twenty-ninth Day of September, 2015

Michelle K. Lee
*Director of the United States Patent and Trademark Office*